United States Patent
Saunders et al.

[11] Patent Number: 6,091,718
[45] Date of Patent: Jul. 18, 2000

[54] RADIO RECEIVERS AND METHODS OF OPERATION

[75] Inventors: Robert Stanley Saunders, London; Nguyen Quan Tat, Hampshire, both of United Kingdom

[73] Assignee: Nokia Mobile Phones Limited, Espoo, Finland

[21] Appl. No.: 08/784,483

[22] Filed: Jan. 17, 1997

[30] Foreign Application Priority Data

Jan. 31, 1996 [GB] United Kingdom .................... 9601940

[51] Int. Cl.⁷ .................................................. H04B 7/212
[52] U.S. Cl. ........................................... 370/331; 370/252
[58] Field of Search .......................... 455/436, 63, 67.3, 455/517, 423; 370/242, 328, 331, 332, 333, 347, 241, 252, 503, 509; 371/47.1

[56] References Cited

U.S. PATENT DOCUMENTS

| | | | |
|---|---|---|---|
| 5,214,687 | 5/1993 | Kansakoski et al. ..................... | 379/60 |
| 5,276,691 | 1/1994 | Kivari ..................................... | 371/47.1 |
| 5,335,356 | 8/1994 | Andersson .............................. | 455/54.1 |
| 5,450,419 | 9/1995 | Hagiawara ................................ | 371/30 |
| 5,537,416 | 7/1996 | MacDonald et al. ..................... | 371/32 |

FOREIGN PATENT DOCUMENTS 2279205  12/1994  United Kingdom .

*Primary Examiner*—Huy D. Vu
*Assistant Examiner*—Alexander Boakye
*Attorney, Agent, or Firm*—Perman & Green, LLP

[57] ABSTRACT

A radio handset and method of operation of same for communication on a selected channel of a radio telephone system in which information is transmitted in bursts, each burst having respective portions independently capable of indicating burst errors. The handset is operable to detect sliding collisions by comparing the distribution of errors over error indicating portions of a received burst.

6 Claims, 11 Drawing Sheets

R-CRC: IS A 16 BIT CRC STORED IN BITS a48 - a63 CARRIED OUT ON THE 48 OTHER BITS IN THE A-FIELD a0 - a47

X-CRC: IS A 4 BIT CRC STORED IN BITS b320 - b323 CARRIED OUT ON THE LAST 16 BITS OF EACH B-SUBFIELD, THE 80 BITS THAT ARE :- b48 — b63
b112 — b127
b176 — b191
b240 — b255
b304 — b323

Z-FIELD BITS: ARE A REPEAT OF THE X-CRC BITS

UNCORRUPTED PACKET: DATA PACKET WITH ERROR DETECTION BIT FIELDS AT THE FRONT (F) AND BACK (B) OF PACKET.

x = BIT ERROR

Fig.10b

PACKET CORRUPTED BY FADE: IN DECT A FADE IS GENERALLY CONSIDERED TO CORRUPT ALL OF THE PACKET.

Fig.10c

FRONT SLIDING COLLISION: CAUSED BY A PACKET FROM AN UN-SYNCHRONISED SYSTEM. ONLY BITS IN FIELD F ARE CORRUPTED.

Fig.10d

BACK SLIDING COLLISION: CAUSED BY A PACKET FROM AN UN-SYNCHRONISED SYSTEM. ONLY BITS IN FIELD B ARE CORRUPTED.

Fig.11.

RADIO RECEIVERS AND METHODS OF OPERATION

BACKGROUND OF THE INVENTION

This invention relates to radio receivers and particularly but not exclusively to such receivers forming part of the transceiver of a portable radio telephone or handset, for communication with a base station in a radio telephone system. The invention also relates to a method of operation of such radio receivers. The invention also relates, particularly but not exclusively, to handsets for communication with base stations in a digital cellular radio telephone system employing transmission by a plurality of carrier frequencies in frames, such as TDMA frames, each consisting of a predetermined number of time slots.

Systems operating under the same protocol can cause problems if their spheres of influence overlap. This is because signals from a user on one system may occur at the same time as a signal from a user of the other system. When the two systems are unsynchronised, this pattern of possible interference is not fixed, instead, as the timing of one system will drift relative to the other, the interference pattern will differ with time. A pair of communication channels utilised on respective systems can 'slide' in and out of interference with one another over a period of time. Such interference is known as a 'sliding collision'.

Figures 1, 1A:
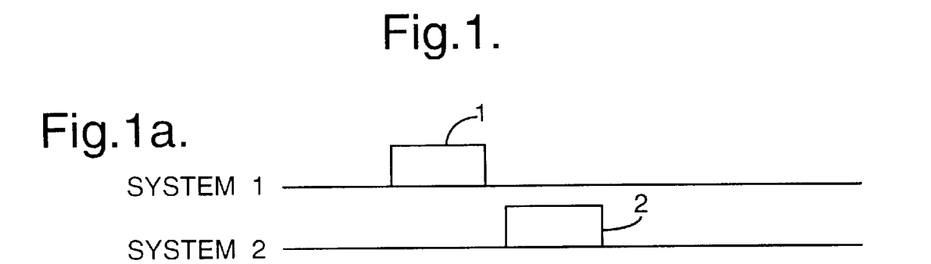
Figure 1B:
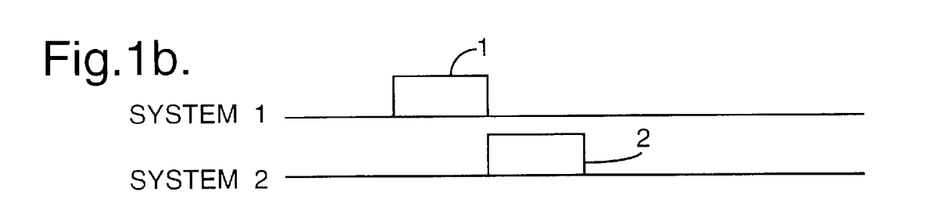
Figure 1C:
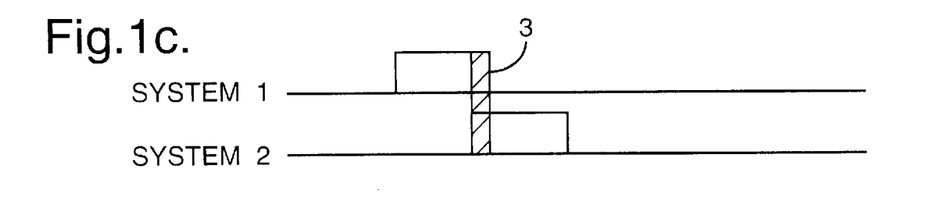
Figure 1D:
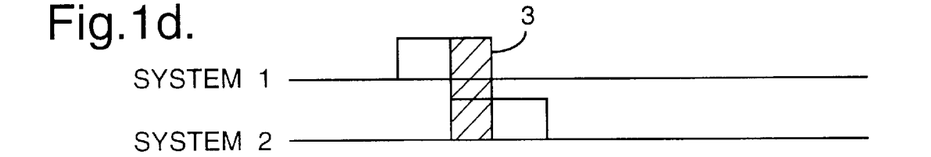

FIG. 1 is an illustration of a sliding collision. In FIG. 1a, bursts from system 1 and system 2 do not overlap. There is, therefore, no interference i.e. no 'collision'. As the bursts drift, one relative to the other, the two bursts come closer (FIG. 1b) and begin to interfere 3 (FIG. 1c). As time passes, interference progressively increases (FIG. 1d).

The sliding collision illustrated in FIG. 1 results in the burst of system 1 losing data at the back end of the burst, while the burst of system 2 loses information from the front of the burst. This type of corruption of a signal has the potential to be very damaging to signal quality and should, therefore, be detected as quickly as possible so that a new channel can be selected. Sliding collisions are difficult to avoid as quickly as might be desirable as, in order to prevent thrashing i.e. frequent or continual hopping of channels, there is normally a delay or hysteresis before a determination to change (handover) channels is made for any detected errors. This prevents temporary deteriorations in channel quality from precipitating channel handover. Such temporary channel deteriorations would typically be caused by fast fades.

SUMMARY OF THE INVENTION

In accordance with the present invention there is provided a radio receiver for communication on a selected channel of a radio telephone system in which information is transmitted in bursts, each burst having respective portions independently capable of indicating burst errors, one of the error indicating portions being disposed towards one end of the burst, wherein the radio receiver comprises processing means operable to select another channel for communication dependent upon the distribution of errors between the respective error indicating portions.

The processing means may be operable to select another channel dependent upon a distribution of errors in which the one of the error indicating portions is indicative of an error absent a similar indication from another of the respective error indicating portions. Such an error distribution may be indicative of a sliding collision. Verification of the error pattern over a number of bursts may, however, be desirable before another channel is selected.

By comparing errors detected by respective portions of the burst, sliding collisions can quickly be distinguished from fast fades or other temporary causes of signal deterioration. This allows information loss due to a sliding collision to be avoided by handing over to a new channel without the in-built hysteresis otherwise required before a fast fade can be distinguished from a permanent signal deterioration.

It may be desirable to make a determination that an error pattern is the result of a sliding collision only following at least two successive bursts showing the same pattern of errors in order to distinguish a sliding collision from other temporary signal deteriorations, for example the start or end of a fast fade affecting the burst.

Handover following an error distribution pattern indicative of a sliding collision may be delayed for a predetermined number of bursts. The processing means may then be operable to handover at the end of the period of delay if the distribution of errors still indicate a sliding collision. This gives one of the handsets communicating on the channel on which a sliding collision is occurring the opportunity to handover, leaving the communication channel free from interference for use by the other handset. If one handset hands over, the error distribution pattern for the other handset will subsequently indicate no interference requiring handover unless the channel has deteriorated for other reasons in which case selection of another channel would no longer be necessary for the 'other' handset.

The one of the error detecting portions is preferably a guard portion at one extreme of the burst protecting the information carried by the burst.

The one of the error detecting portions may be at the front or rear of a burst. Preferably there is an error detecting portion towards each end of the burst allowing sliding collisions occurring from each direction to be detected efficiently.

If the portions at each end of a burst are guard portions it can be several frames before data is lost as a result of a sliding collision. This is because there is typically some regulation on clocking frequency for independent systems which means sliding collisions are generally slow, giving time to enable a more certain determination of a sliding collision to be made before handover is attempted.

The second portion may be a separate error detection string within the burst or a portion towards the opposite end of the burst. It is possible for more than one error detection field to be utilised in determining if an error is the result of a sliding collision.

In accordance with a second aspect of the invention there is provided a method of operation of a radio handset for communication on a radio telephone system in which information is transmitted in bursts, each burst having respective portions independently capable of indicating burst errors, one of the error portions being disposed towards one end of the burst, comprising selecting another channel for communication dependent upon the distribution of errors over the respective error indicating portions.

BRIEF DESCRIPTION OF THE DRAWINGS

The invention will be described in more detail with reference the accompanying drawings of which.

DETAILED DESCRIPTION OF THE INVENTION

In the described example shown in the drawings, the radio telephone system conforms to the DECT (Digital European Cordless Telecommunications) standard and uses ten carrier frequencies, separated by 1.728 MHz, within a frequency band from 1880 MHz to 1900 MHz. This system divides time into TDMA frames, with each frame having a time duration of 10 ms. Each frame is divided into 24 time slots, numbered from 0 to 23. Each frame is divided into two halves, the first half (slots 0 to 11) being reserved for the transmission of the base station and the second half (slots 12 to 23) being reserved for the transmission of the handset.

Figure 2:
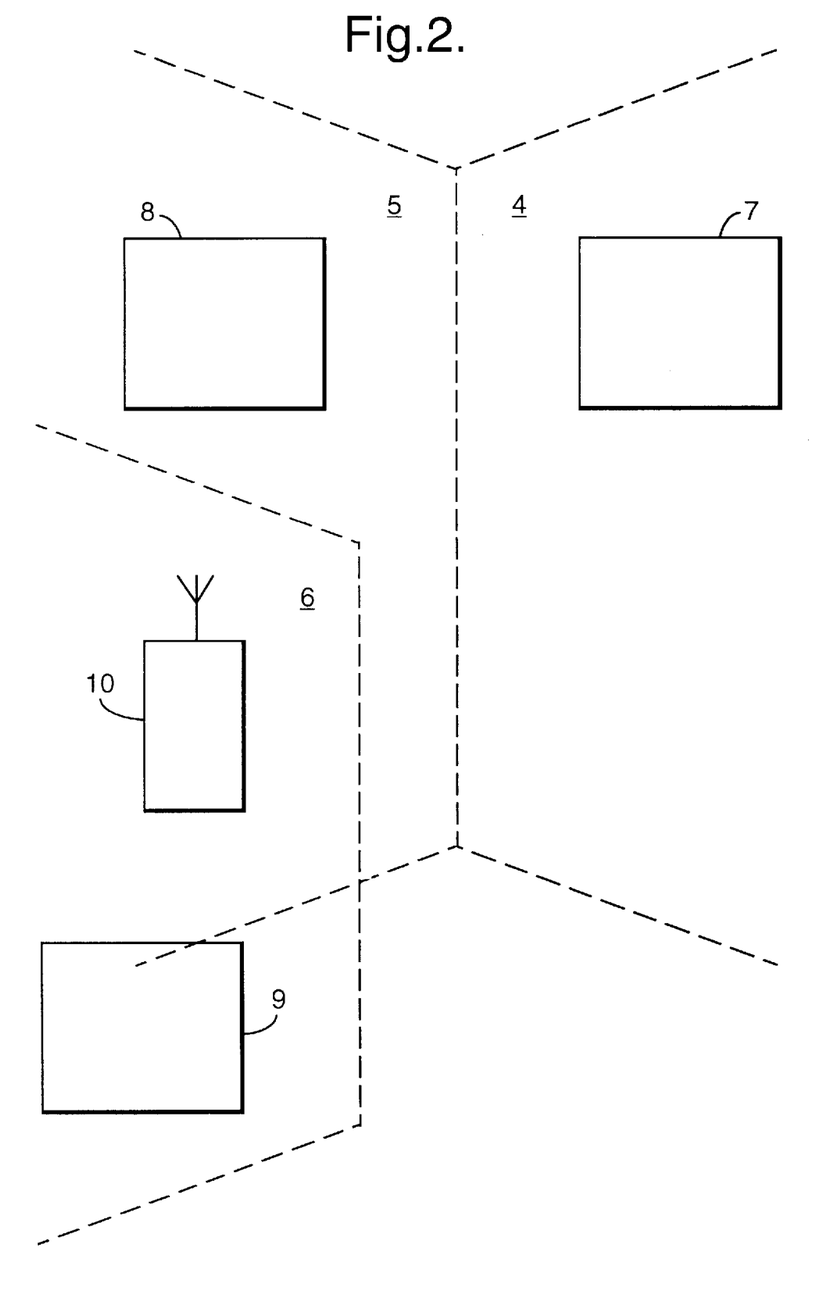
FIG. 2 is a schematic representation of overlapping cells of a system of the present invention.

A DECT system typically includes one fixed part, and several radio fixed parts or base stations. Two fixed parts one with synchronised radio fixed parts (RFPs) 7,8 supporting respective cells 4,5 and the other with a radio fixed part 9 unsynchronised with the other fixed parts supporting a cell 6 are illustrated. Two of the RFPs 8,9 support respective overlapping cells 5, 6 illustrated in FIG. 2. Many portable parts 10 or handsets can use each system although a handset would need authorisation to use a particular system. Each fixed part is physically connected to a standard wireline telephone system, each radio fixed part is physically connected to one of the fixed parts.

Figure 3:
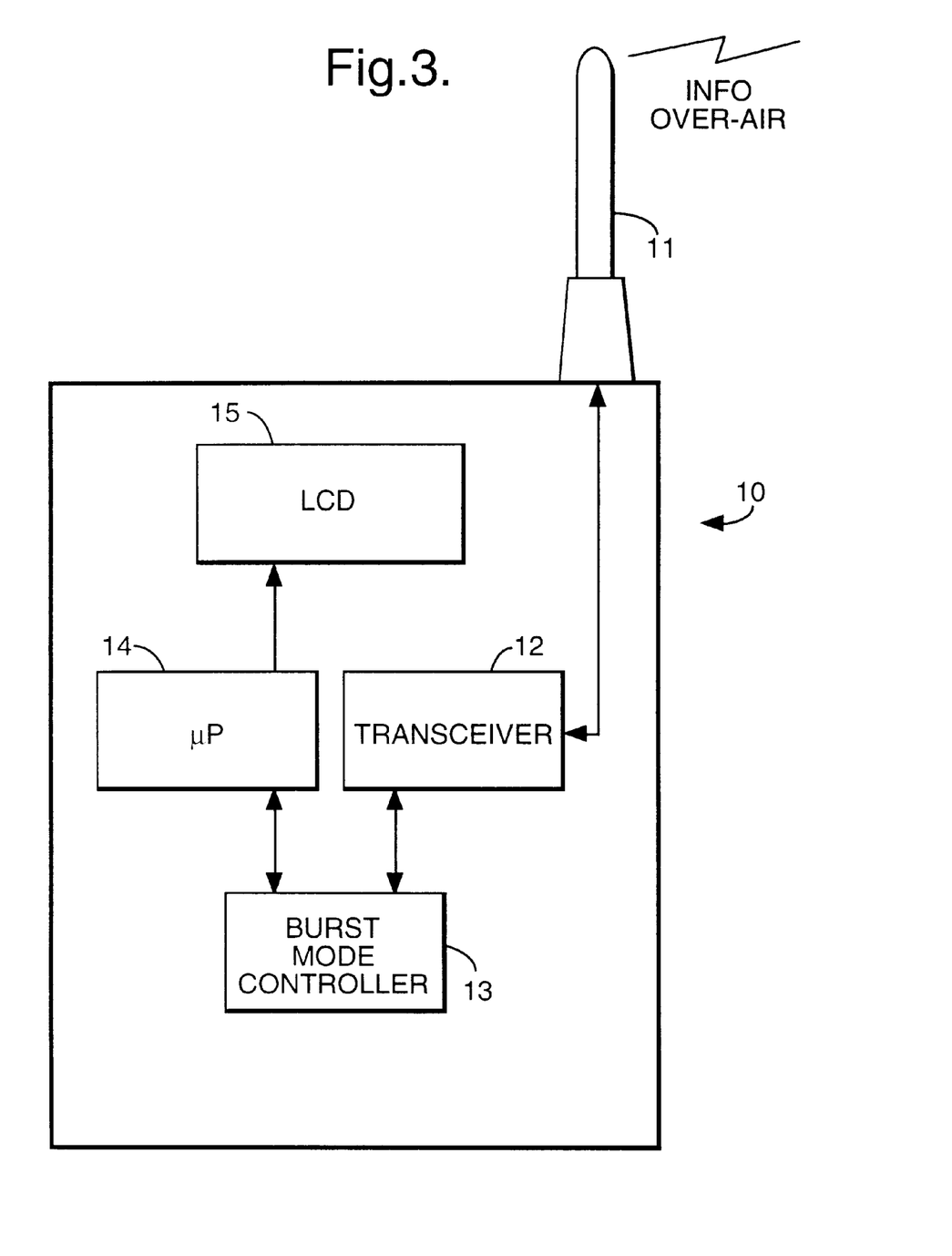
FIG. 3 is a schematic representation of a handset in accordance with the present invention.

Each handset has an antenna 11, a transceiver 12, burst mode controller 13 and processing means 14 programmed with an algorithm which is operative to select a communication channel with a base station. User information is displayed on a Liquid Crystal Display (LCD) 15. (FIG. 3)

Figure 4:
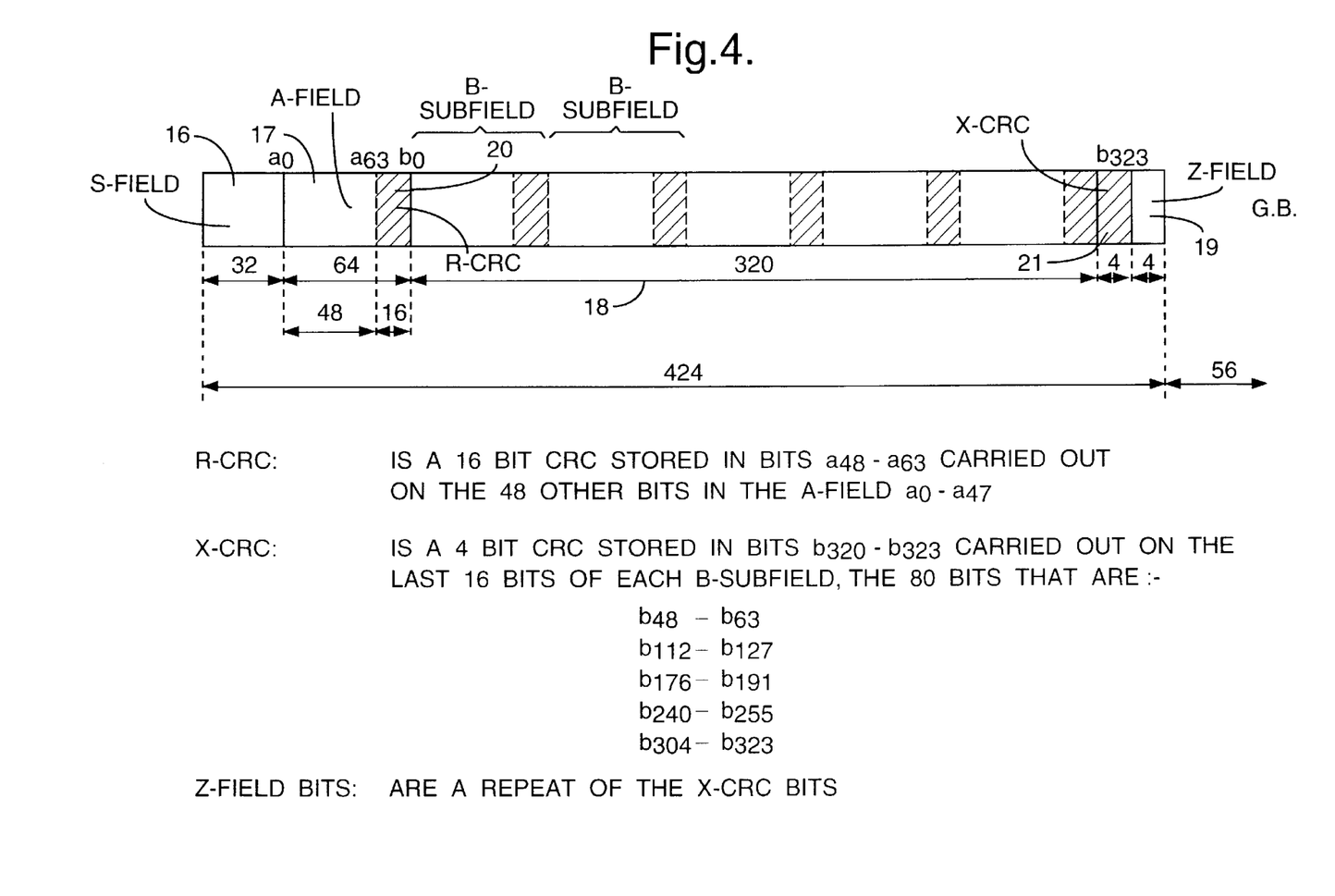
FIG. 4 is a schematic representation of a signal burst under the DECT protocol.

Under the DECT protocol, each signal burst is divided into four fields. The signal burst structure is illustrated in FIG. 4. The S-field 16 used for synchronisation, and the A-field 17, used to send signalling information in accordance with the DECT protocol are both used when locking on i.e. finding a channel (a combination of carrrier frequency and time slot) for receiving system information. The B-field 18 is used for sending speech or data to a system user and the Z-field 19 is provided for sliding error detection. In addition to the Z-field, the A and B fields have their own error detection sub-fields known as Cyclic Redundancy Checks (CRCs) R-CRC 20 and X-CRC 21 respectively. The A-field is 64 bits long with the final 16 bits, the R-CRC 20, providing an error check on the preceding 48 bits. The B-field is 320 bits. The 4 bit X-CRC 21 provides an error check on the B-field. The Z-field 19 is a repetition of the X-CRC 21.

When bursts from unsynchronised signals collide it is the ends of the respective packets that are lost first i.e. the S-field and the Z-field for a DECT burst. Neither of these fields carry the information of the burst. The S-field allows synchronisation to occur and the Z-field allows for the detection of errors. These fields can be lost without impairing the ability of the portable part to receive all the information carried by a burst provided the burst can still be received. An advanced warning can, therefore, be given of a sliding collision before it is detrimental to information transfer. In the embodiment described the information transferred by the burst is protected from loss due to a sliding collision for a number or cycles by the S- and Z-fields used for the detection of sliding collisions.

Figure 5A:
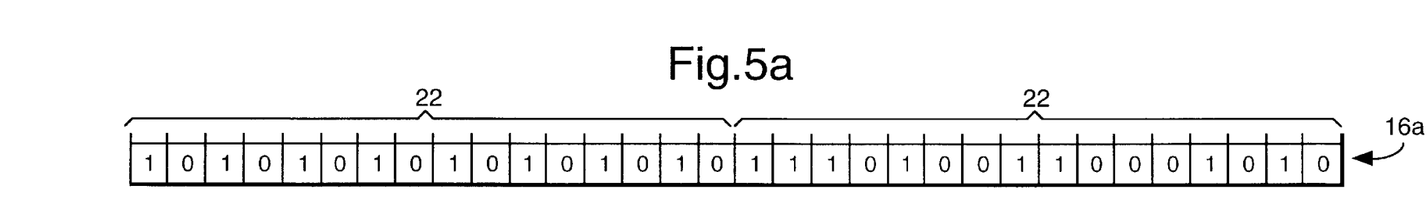
FIG. 5 is a schematic representation of the S-field of the burst of FIG. 4.
Figure 5B:
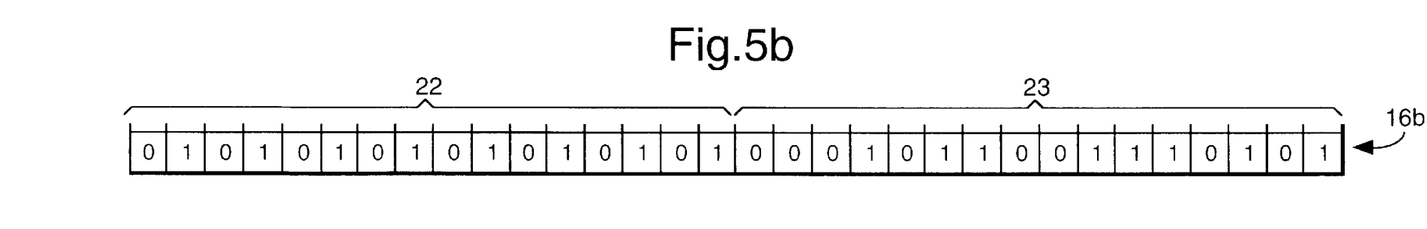

FIG. 5 illustrates the two types of S-field 16 utilised under the DECT standard. One is used in transmissions by the fixed part (FIG. 5a) and the other for transmission by the handset (FIG. 5b). Both S-fields 16a, 16b are similar in that they include a preamble portion 22 used for 'lock' recovery, or bit synchronisation, and a synchronisation word 23 used for slot recovery. The preamble 22 in each case is a sequence of zero/one transitions. If the synchronisation word 23 detected is the known synchronisation word, bit synchronisation is confirmed and a known position within the burst has been established. The receiver uses the synchronisation word to locate the beginning of the A-field and can then use subsequent fields to obtain the information carried by the burst.

Figure 6:
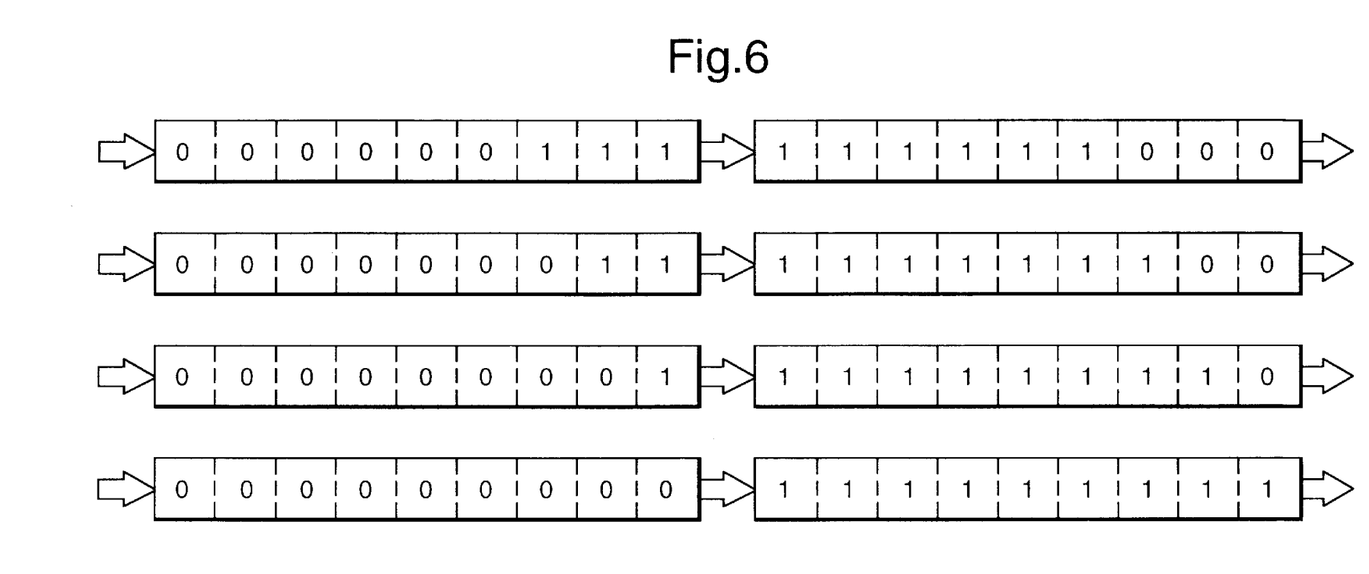
FIG. 6 is a schematic representation of a method of gaining lock recovery on the S-field of FIG. 5.

Lock recovery can be achieved in a number of ways, one of which is illustrated in FIG. 6. FIG. 6 shows a sequence in which two 2×9 bit banks 30, 31 are seen for successive oversample periods for nine times oversampling a received signal. The incoming bit stream is sampled 9 times and the oversampled 1s and 0s are stored in a bank of shift registers. The contents of the banks are compared each clock cycle until the 0-1 and 1-0 transitions fall at the junction between two bit banks 22. When the banks contain respectively nine 0s and nine 1s the phase of the bit rate clock on the burst mode controller is shifted to comply with the phase of the clock cycle determined from the oversampling. This example used nine times the oversampling, other oversampling rates could, however, be employed.

To allow synchronisation under conditions of poor signal reception, it is not necessary or the banks to contain nine 0s and nine 1s before a transition is detected. In order for lock recovery to still be achieved, a compromise will be necessary and lock recovery identified when say seven or more 1s and 0s are present in the central seven bits of the respective banks. Other criteria could, however, be chosen to establish the location of a zero/one or one/zero transition. Under these conditions, however, location of a single zero/one transition will typically not be sufficient for lock recovery to be consistently achieved.

Figure 7:
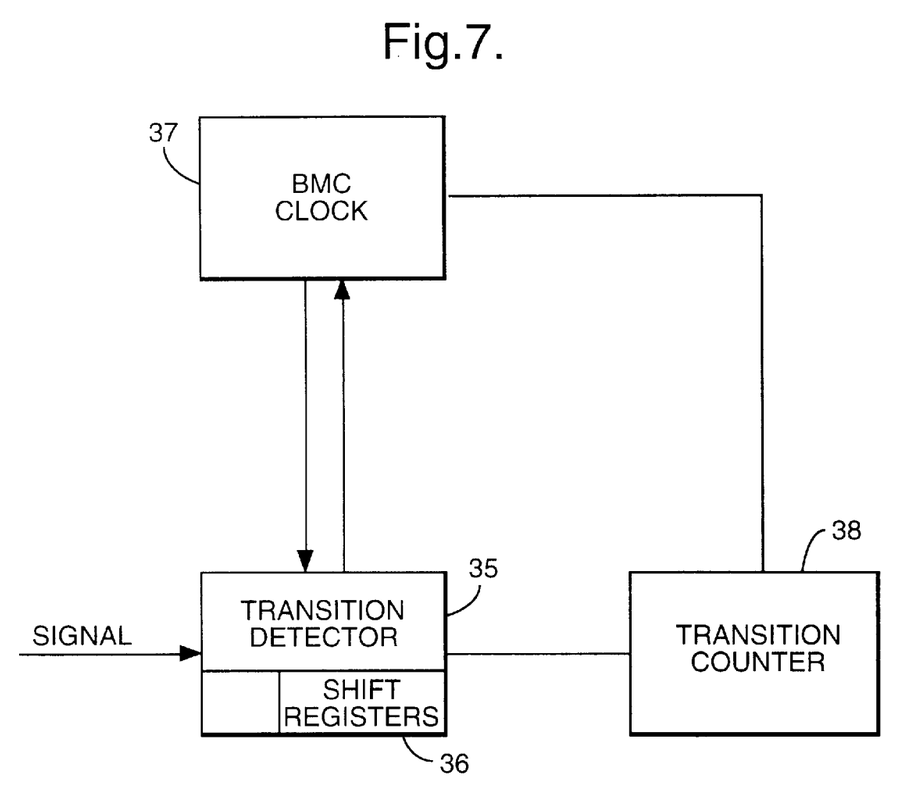
FIG. 7 is a schematic representation of apparatus for gaining lock recovery.

FIG. 7 shows an apparatus for determining a lock recovery point. A transition detector 35 receives an incoming burst on a monitored channel. The transition detector 35 contains shift registers 36 and detects a transition when the two bit banks 30, 31 (FIG. 6) register a transition as explained previously. When a transition is detected the phase of a clock 37 in the BMC is adjusted or reset. The number of zero-one transitions are counted by a transition counter 38. The transition counter 38 sends a signal to the BMC 37 to prevent it from being adjusted or reset further once a predetermined number of proper transitions have been identified by the transition detector.

Figure 8:
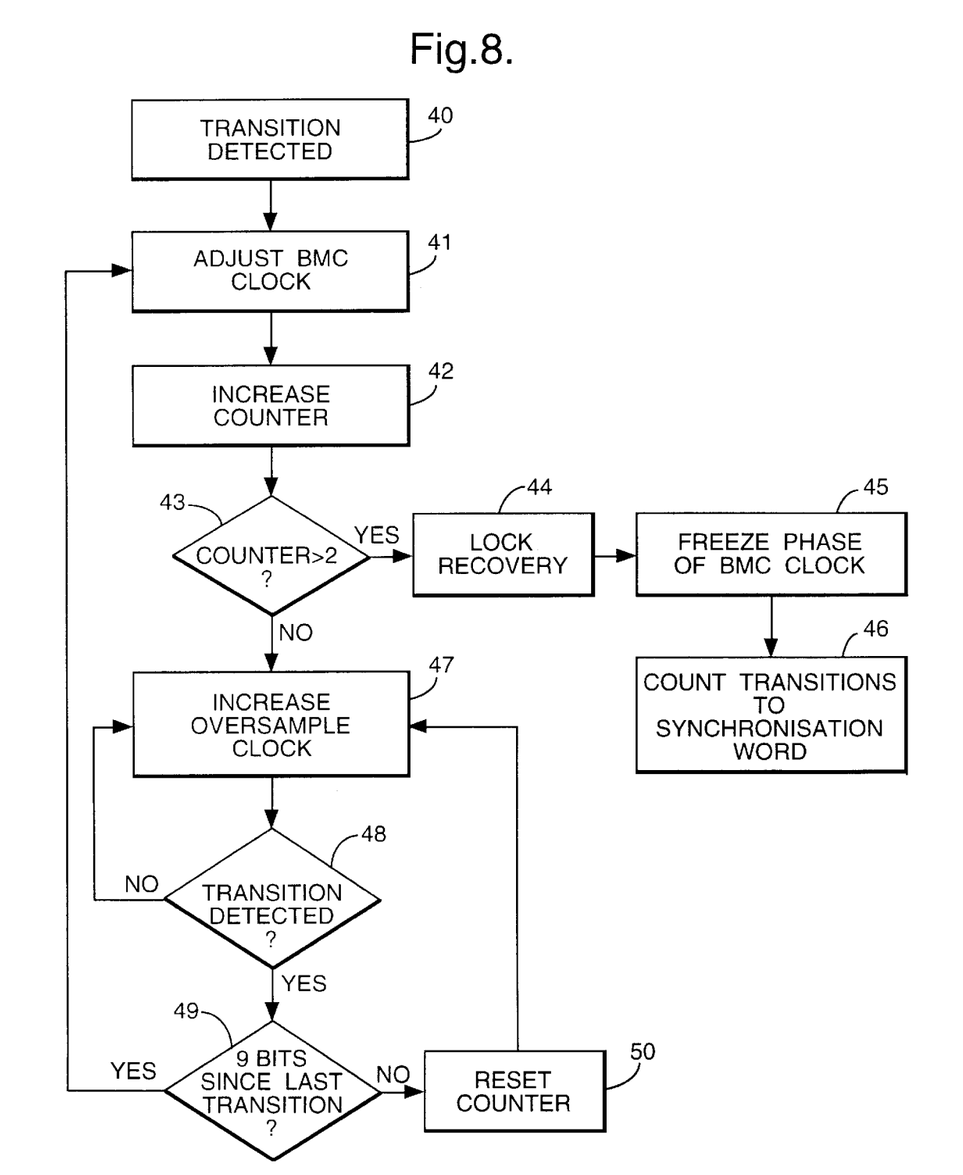
FIG. 8 is a flow chart illustrating operation of the apparatus of FIG. 7.

FIG. 8 is a flow chart describing operation of the apparatus of FIG. 6. Once the oversampled incoming signal is positioned in the bit banks such that a 0-1 transition occurs at the junction of the two banks, a transition has been detected 40. When a transition is detected the BMC clock is adjusted 41 and a counter increased by one 42. If the counter registers more than two, 43 it means that this is the third successful transition that has been detected and lock recovery is deemed to have been achieved 44. The BMC clock is frozen 45, ie no further adjustments are made to the phase of the clock which then remains the same for the duration of the received burst. The transition counter then continues to count the number of transitions to the beginning of the synchronisation word 46. This can be achieved either by detecting the first 1-1 or 0-0 transition following the preamble depending on whether it is the base station or the handset that is receiving the burst and stopping the count at that stage. Alternatively the end of the synchronisation word could be detected and the number of counts to the beginning calculated by subtracting 16 bits from the end point. In either fashion the number of bits to the synchronisation word can be determined. The interval to achievement of slot synchronisation could, however, be determined in other ways.

If the counter does not register more than two, 43 the oversample clock is increased by one 47 until another transition is detected 48. A determination is then made as to whether there have been exactly nine oversample bite since the last transition 49. If there have, the BMC clock is adjusted 41, the counter increased and the process continued to detect the next transition. If not, the counter is reset 50, and the oversample clock increased 47 until the next transition is detected 48. Once lock recovery has teen achieved, the number of bits to the synchronisation word can be counted.

By continuing to count the 0-1, 1-0 transitions until the synchronisation word is received, an indication of the ease with which bit synchronisation has been achieved is made. This can be used as a measure of the signal quality as it is Easier to achieve lock recovery when a received signal is of good quality than when it is of poorer quality. The fewer transitions remaining to detection of the synchronisation word the poorer the signal quality. By comparing the results achieved for successive bursts, deterioration or improvement in signal quality can also be monitored.

For example, if over a number of bursts, the number of transitions between lock recovery and the start of synchronisation word are as follows:

8, 8, 7, 8, 8, 7, 8, 8, 7, 7, 7, 6, 6, 6, 5, 5

The increasing interval necessary to establish lock recovery indicates that the S-field is of increasingly poor quality. If for one particular burst it is recognized that synchronisation has taken longer than would otherwise be expected, an error in the S-field can been assumed. By using the S-field in this fashion to detect errors, it is possible to detect a sliding collision before The A- or B-fields are corrupted.

Figure 9:
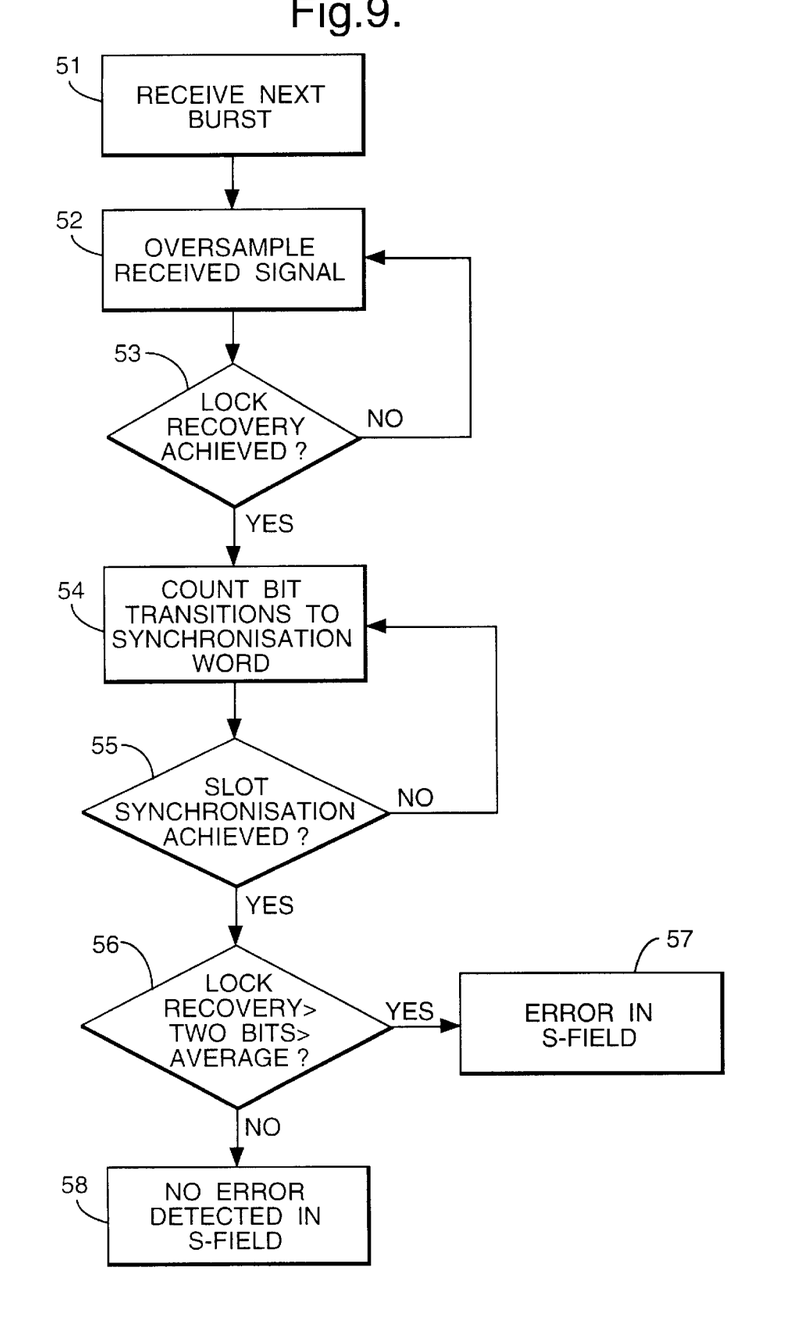
FIG. 9 is a flow chart illustrating a method for determining errors in the S-field.

FIG. 9 is a flow chart illustrating one method for determining if an error is occurring in the S-field 11 of a received burst. A burst is received 51, and in one possible embodiment oversampled 52 in accordance with the explanation given above. A determination is then made as to whether or not lock recovery has been achieved 53. If it has, the number of bit transitions to the synchronisation word is counted 54. Once slot synchronisation 55 has been achieved, the processor determines if lock recovery was achieved more than two bits later than average 56. The average can be a dynamic figure stored on the basis of the most recent information received relating to the signal or could be a default illustrating a normal lock recovery point. A compromise between a strict default setting and a dynamic assessment of the average could, however, be used. If lock recovery occurs more than two bits later than average, an error in the S-field is flagged 57. If not, no such error is detected 58.

Errors in the Z-field 19 can be detected in a more straight forward fashion. The Z-field is transmitted as a repeat of the preceding X-CRC 21 used to detect errors in the B-field 18. If there is a discrepancy between the X-CRC and the Z-field, either the X-CRC has been corrupted and the Z-field remains unaffected, a very unlikely result as fades typically last several bursts and not merely several bits, or the Z-field has been corrupted and the X-CRC is uncorrupt. Of course there is always the possibility that both the X-CRC and Z-field have been corrupted.

Sliding collisions can be distinguished from other causes of signal deterioration such as fast fades in the manner that they effect the error pattern in a signal burst. FIG. 10 illustrates different error patterns with an indication of the most likely cause of each.

Figure 10A:
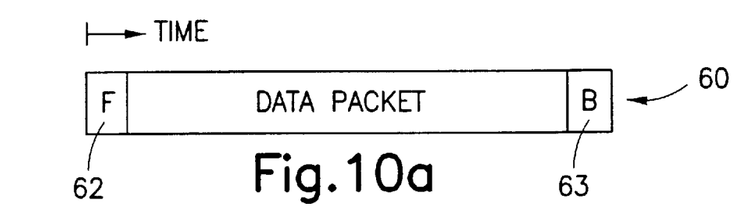
FIGS. 10a–10d are schematic representations of errors in a burst.
Figure 10B:
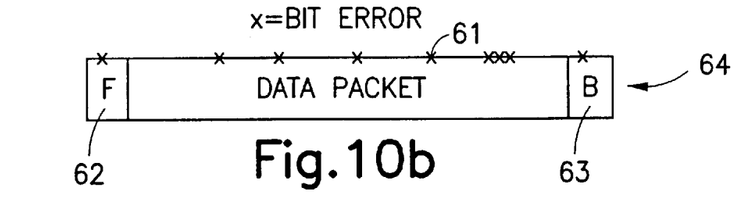

In the burst 60 of FIG. 10a there are no bit errors 61 in the data packet. The fields at the front 62 and back 63 of the burst are also error free. This indicates an uncorrupt burst or packet of data. FIG. 10b illustrates a burst 64 with bit errors 61 distributed throughout the burst. There are errors in both the front and the back error fields 62,63. The burst is corrupted. The most likely cause of the error pattern of FIG. 10b is a fade. Such a fade can last over a period of several bursts and result inevitably in the loss of information transferred. Fades can be temporary and it is not typically desirable to attempt handover each time a fade is detected in a single burst. The signal is typically monitored over a number of bursts and if the signal recovers within this period the transmission channel is maintained. If not handover is necessary and a new channel is selected.

Figure 10C:
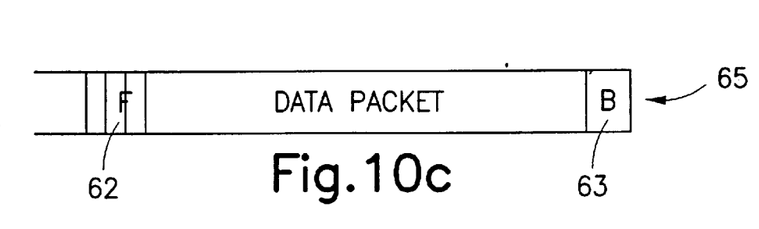
Figure 10D:
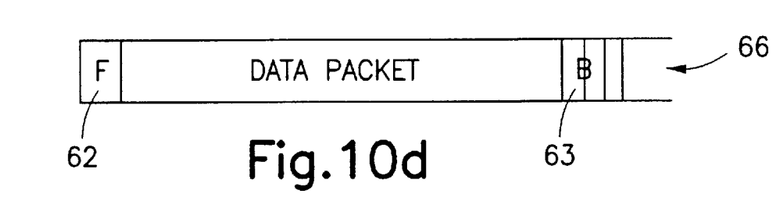

FIG. 10c illustrates a burst 65 in which bit errors 61 are detected in the front field 62, but not in other regions of the burst. This pattern is indicative of a sliding collision corrupting the front of the signal. The situation is not, however, entirely unambiguous as the same error pattern may occur as a result of the end of a fast fade. By monitoring the distribution of errors for bursts on two consecutive frames this conflict can be resolved. If a similar bit error pattern to FIG. 10c is detected in the following burst the front sliding error can be distinguished from the end of a fade. A similar situation is illustrated in FIG. 10d where bit errors 61 are only found in the back field 63 of the burst 66. This points to there being a sliding collision corrupting the back of the burst. Again to distinguish this error pattern from one occurring as the result of the start of a fast fade, it may be necessary to monitor the situation for two consecutive bursts. If the pattern is similar for both bursts a back sliding collision can be assumed.

If the Z-field alone is used for discovering sliding collisions it will be unable to distinguish a signal corruption causing the X-CRC alone to be corrupt; from a fast fade causing both the X-CRC and the Z-field to be corrupt. By comparing errors in the Z-field with errors in a field displaced from the Z-field, for example the R-CRC 20 or the synchronisation field 16, a sliding collision can be unambiguously distinguished from other types of signal corruption, particularly if a pair of consecutive bursts are monitored.

Figure 11:
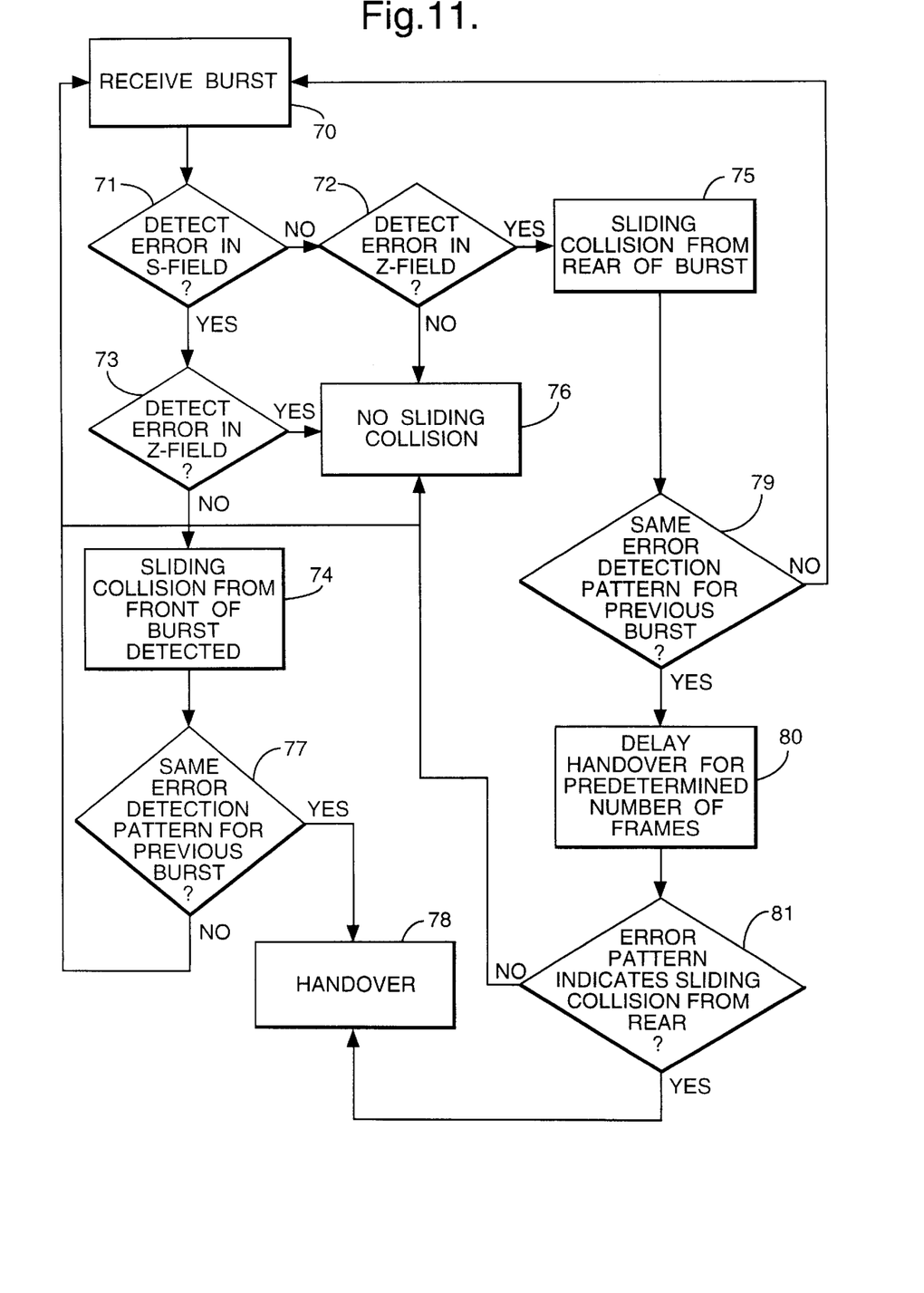
FIG. 11 is a flow chart illustrating an embodiment of the invention.

FIG. 11 illustrates one way in which information gathered regarding the bit errors in a burst can be used to detect both front and rear sliding collisions. In this embodiment the synchronisation field and Z-field are used to detect sliding collisions, a third or other additional error fields could also be used with the S-field and Z-field to detect errors. In the described embodiment handover is also delayed for a detected back sliding collision so that both handsets experiencing a sliding collision do not handover simultaneously.

This is optional to avoid unnecessary pressure on channel allocation resources for one of the interfering systems.

By delaying handover when a sliding collision corrupting one end of a burst, say the back, is detected and continuing to monitor the error patterns for subsequent bursts for two handsets operating under the same algorithm, the handset experiencing a front collision would handover first. By the time the handset experiencing a back sliding collision is ready to handover the other handset in the collision would have already have handed over leaving the channel free from interference. This should result in the error pattern of the handset experiencing the back sliding collision showing no errors. Unless the channel has deteriorated for other reasons it should be unnecessary to handover.

Once a burst is received 70, a determination is made as to whether or not an error in the S-field has been detected 71. A second determination is then made as to whether an error in the Z-field has been detected 72,73. If an error is found in the S-field but not the Z-field, a sliding collision from the front is determined to be a possibility 74. If errors are found in the Z-field but not in the S-field a sliding collision from the back is determined to be a possibility 75. If neither, or both, fields show errors no sliding collision is detected 76.

If a front sliding collision is considered a possibility 74, whether or not the same sliding error detection pattern was recorded for the previous burst is determined 77. If a positive determination is made, a new channel is selected for handover 78. If not, the next burst is received 70, and if the error pattern is the same for that subsequent burst, a new channel will be selected for handover 78.

If a back sliding collision is considered a possibility 75, whether or not the same sliding error detection pattern was recorded for the previous burst is determined 79. If yes, handover is delayed 78 for a predetermined number of frames. Under the DECT protocol 6 to 8 frames would give the other handset the opportunity to handover. Fewer frames may, however be possible. If the error detection pattern was not the same for the previous burst 79, the next burst is received 70, and the error pattern considered in the same fashion. If the error pattern was now the same for the previous burst 79, handover will be delayed 80. The error patterns of the bursts received in the period of delay are monitored 81 and handover only occurs if the error pattern indicates that a back sliding collision still exists. Because the Z-field is only short, a back sliding collision after 6 to 8 frames may show itself as errors in both the X-CRC and the Z-field. Appropriate error patterns to indicate such a back sliding collisions could, therefore, be used.

The delay in handover following detection of a front or a back collision, in this embodiment a back collision, enables a handset experiencing a front collision to handover to a new channel before a handset experiencing a back sliding collision. By allowing one of the handsets involved in the sliding collision to handover before the other, prevents both handsets from handing over where one would have been sufficient. By the time a burst is received on the monitored channel in a subsequent frame by the handset delaying handover no sliding collisions would be detected if the other handset has already handed over to a new channel. This improves the dynamics for the systems. The advantage would be the same if handover following a front sliding collision was delayed beyond that following a back sliding collision. The maximum benefit of this arrangement is achieved when both handsets involved in a sliding collision are following this same rule. There is, however, little disadvantage in a delay even if the other handset does not handover to a new channel in the interim.

If the delay option is not included in accordance with the present invention a slicing collision can be detected within two frames of it occuring. This enables a new channel to be selected more quickly than for other types of channel deterioration and allows a new channel to be selected for handover before a significant amount of information is lost.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention. The invention is also applicable for use under protocols other than DECT including Wireless Customer Premises Equipment (WCPE) and Personal Handyphone System (PHS) and is in particular, not restricted to use in digital radio telephone systems or cordless systems.

What is claimed is:

1. A radio receiver for communication on a selected channel of a radio telephone system in which information is transmitted in bursts, each burst having respective portions independently capable of indicating a burst error, one of the error indicating portions being disposed towards one end of the burst, wherein the receiver comprises processor operable to select another channel for communication dependent upon the distribution of errors between the respective error indicating portions, wherein handover to a selected channel is delayed for a predetermined number of received bursts, the processor being operable to handover after the delay dependent upon the distribution of errors of at least one burst received during the period of delay.

2. A radio receiver according to claim 1 wherein the at least one burst is the final burst prior to the end of the delay period.

3. A radio receiver according to claim 2 wherein the another error indicating portion is a guard portion for protecting information carried by the burst.

4. A radio receiver for communication on a selected channel of a radio telephone system in which information is transmitted in bursts, each burst having respective portions independently capable of indicating a burst error, one of the error indicating portions being disposed towards one end of the burst, wherein the receiver comprises processor operable to select another channel for communication dependent upon the distribution of errors between the respective error indicating portions, wherein the one of the error indicating portions is a synchronisation field.

5. A method for operating a wireless communications system to avoid a loss of data due to an occurrence of a sliding collision, comprising steps of:

transmitting signals from a transmitter to a receiver on a selected channel, each of the transmitted signals having a beginning and an end and containing at least one digital data portion and a plurality of error indicating portions, each of the error indicating portions being independently capable of indicating an occurrence of an error in the transmitted signal, wherein at least one of the plurality of error indicating portions is located either at the beginning of the transmitted signal or at the end of the transmitted signal for being responsive to an occurrence of a sliding collision with a signal transmitted from another transmitter;

receiving the transmitted signal; and selectively maintaining the currently selected channel or initiating a handover to another selected channel as a function of a distribution of error indications between the plurality of error indicating portions as determined from a plurality of received transmitted signal.

6. A method as in claim 5, wherein each of the transmitted signals occurs during a respective time slot of a TDMA radio channel.

* * * * *